(12) United States Patent  (10) Patent No.: US 6,283,040 B1
Lewin  (45) Date of Patent: Sep. 4, 2001

(54) ADJUSTABLE HEIGHT RAIL CAR

(76) Inventor: Henry B. Lewin, 9205 Fox Lair Dr., Burke, VA (US) 22015

( * ) Notice: Subject to any disclaimer, the term of this patent is extended or adjusted under 35 U.S.C. 154(b) by 0 days.

(21) Appl. No.: 09/200,940

(22) Filed: Nov. 25, 1998

(51) Int. Cl.$^7$ .......................... B61D 17/00; B61D 15/04
(52) U.S. Cl. ............................ 105/404; 105/393
(58) Field of Search .................. 105/238.1, 355, 105/356, 377.01, 379, 404, 393, 396, 454, 361, 363, 370; 296/165, 171, 26.04, 26.05, 50

(56) References Cited

U.S. PATENT DOCUMENTS

| | | | | |
|---|---|---|---|---|
| 2,656,216 | * | 7/1953 | Bobroff | 296/127 |
| 3,841,691 | * | 10/1974 | Byer | 296/23 |
| 4,751,883 | * | 6/1988 | Bealer | 105/238.1 |
| 5,028,088 | * | 7/1991 | Del Monico et al. | 296/27 |

* cited by examiner

*Primary Examiner*—S. Joseph Morano
*Assistant Examiner*—Robert J. McCarry, Jr.
(74) *Attorney, Agent, or Firm*—Holland & Knight LLP

(57) ABSTRACT

A railroad car with adjustable floor and roof sections that allow a user to convert the car from a bi-level to a tri-level car. The overall height of the car can be reduced, which results in reduced costs because the need to stockpile bi-level and tri-level cars for use on routes with different height restrictions is eliminated.

16 Claims, 14 Drawing Sheets

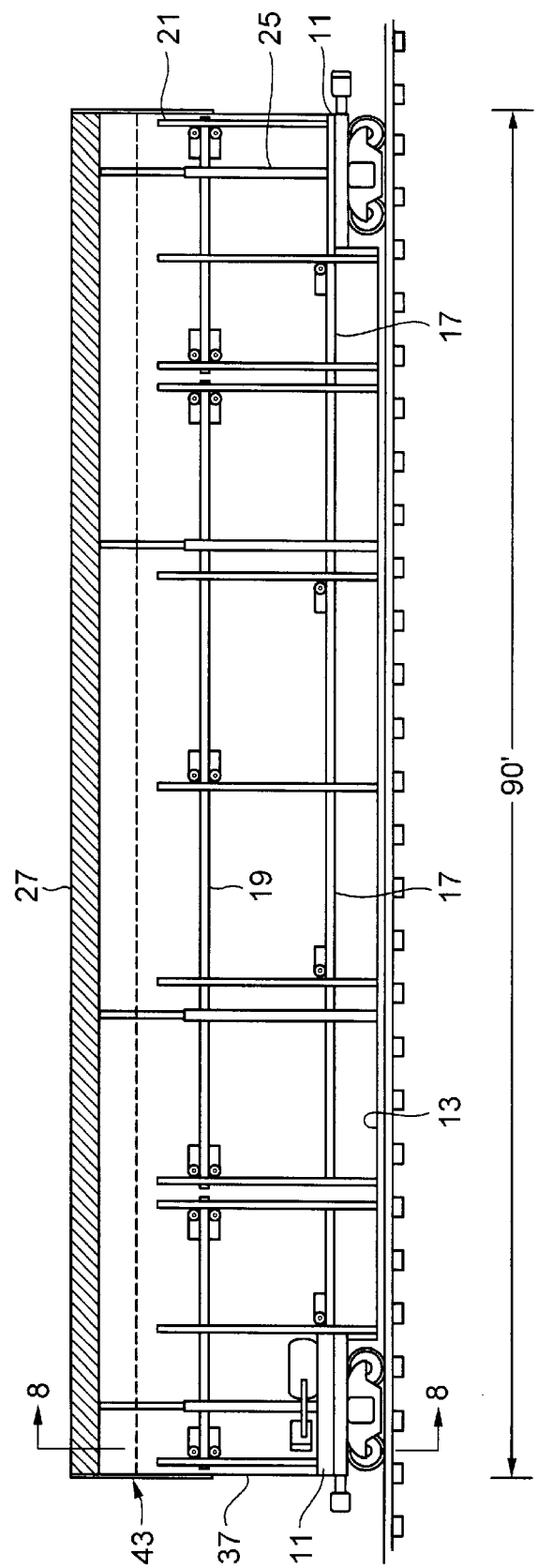

Appearance at Maximum Height
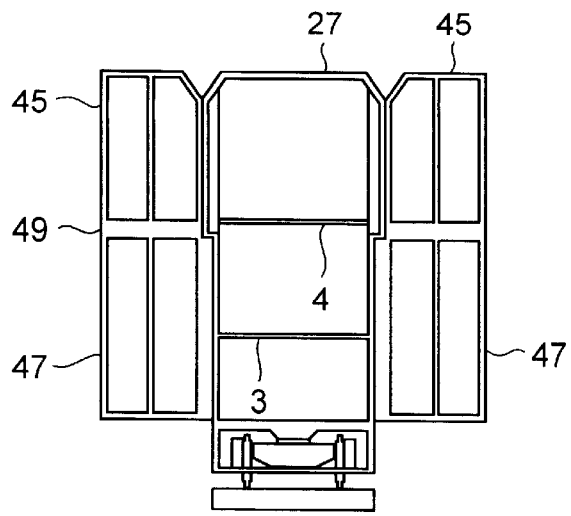
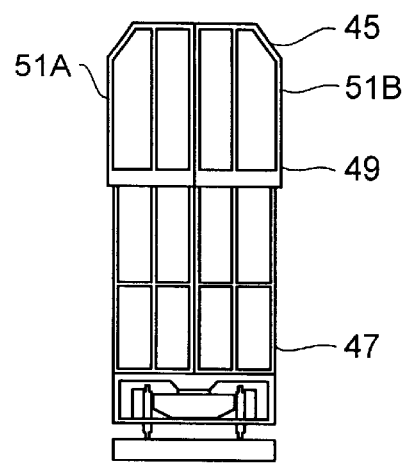
FIG. 7A          FIG. 7B
Appearance at Maximum Height
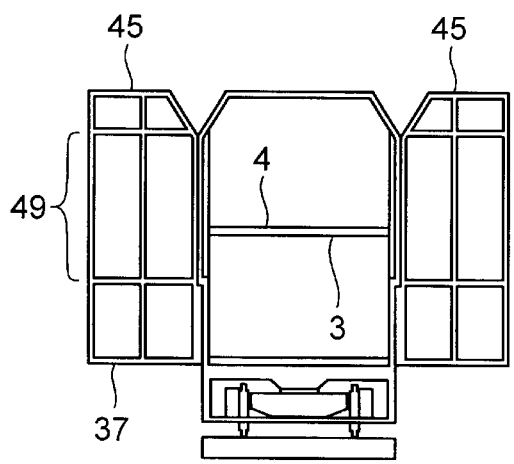
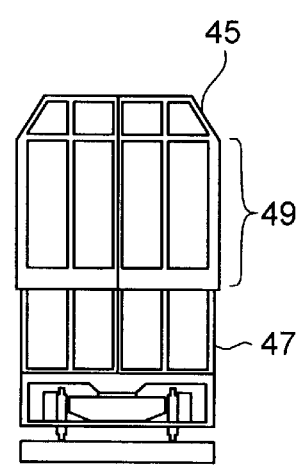
FIG. 7C          FIG. 7D

ADJUSTABLE HEIGHT RAIL CAR

BACKGROUND OF THE INVENTION

The present invention relates to an improvement in railroad freight car multilevel auto carriers used for transporting automobiles and vans.

Automobile vehicles such as cars, pick-up trucks and vans are routinely transported by rail carrier. For this purpose, the industry has developed specialized rail cars having multiple decks on which vehicles are positioned. In general, these rail cars may have either two or three decks. In some instances, the elevated decks may be vertically adjustable either to facilitate loading or to change the deck structure between a bi-level and a tri-level configuration. For example, a rail car may be configured with two decks, i.e., a floor and one elevated intermediate deck, for carrying vans which have a greater height, or configured with three decks if the cargo is compact cars. The external dimensions of such rail cars are not effected by adjustment of the deck positions.

Currently, many railroads are restricted from maximizing their economic opportunities when transporting automobiles, trucks and vans because of fixed height rail car construction on multilevel auto carriers, i.e., the height of the top of the auto carrier rail car is fixed with respect to the rail bed or tracks on which the car operates. For example, if a train is hauling a tri-level auto carrier rail car, that train may be required to travel longer routes to avoid the height restrictions imposed by low bridges and tunnels throughout the nation. In some instances, entire markets in some areas are removed from service because of height restrictions. In addition to the lost time, additional mileage and cost to route these trains, the rail carrier or shipper must keep an inventory of bi-level and tri-level cars to service the specific needs of customers with various vehicle types and sizes. If the rail carrier or shipper relies solely on lower height bi-level rail cars, capacity is lost in those areas without height restrictions thereby increasing the average shipping cost for all vehicles.

SUMMARY OF THE INVENTION

The present invention relates to a railroad car with adjustable floor and roof sections that allow a user to convert the car from a tri-level to a bi-level car or to a single level car, and to reduce the overall height of the car, while lowering the car's center of gravity and alleviating the problem of route height restrictions.

In general, the present invention comprises an adjustable height rail car for transporting vehicles including a first floor adjustable to a horizontal plane situated equal to or lower than a horizontal plane of a center sill; a second floor and a third floor, each of the first, second and third floors being independently adjustable to respective maximum and minimum heights; a roof, the roof being adjustable to a maximum and minimum height relative to the height of the third floor, an adjusting mechanism fixedly connected to the each of the first, second, third floors and roof for adjusting the relative heights of the first, second and third floors and roof and whereby the first, second and third floors and roof are adjustable independently or in unison to thereby lower the height of the rail car to accommodate vehicles of differing heights and allow the use of the rail car on height restricted rail routes and meeting rail clearance requirements of the individual railroads.

In a preferred embodiment, a short center sill, side sills and a first floor are incorporated into the rail car. The first floor drops into the structure of the rail car below the horizontal plane of the center sill (beyond the truck assembly) to within a minimum distance, preferably about 4 inches, of the rail. This, in conjunction with the adjustable floors and adjustable height roof, permits a user to overcome the problem of existing multilevel fixed height cars that exceed many tunnel and bridge height restrictions throughout various rail systems. Moreover, the adjustable floor and height features allow a user to significantly reduce the number of multilevel auto rack rail cars which must be kept on hand to accommodate varying vehicle size and shipping height requirements.

For some carriers, a difference of as little as ½ inch can be a major factor in height restrictions on any given route. This could cost the railroad and shipper thousands of dollars in operating costs and delays in their deliveries. Additionally, it could deny the railroad and shipper access to entire market cities in some regions. A multilevel auto carrier with features that allow modification from a bi-level carrier to a tri-level carrier and a mechanism that adjusts the height of the floors and overall height of the rail car, is most advantageous. It enables a user to maximize the number of cars and/or vans to be hauled on a single car, reduces costs, increases profits, and helps to reduce or eliminate many routing restrictions. The features of the present invention also allow the railroad operators to increase use of the railroad car in mixed service, i.e., with cars, trucks and vans individually or in any combination thereof.

The invention provides a user with the ability to adjust the floor position and height of each car rail to the minimum height needed for hauling vans, trucks or cars. For instance, a train's cargo may be made up of vans that have a height of 69 inches and/or automobiles which may be 54 inches in height. Vans may be loaded on the lower level while cars are loaded on the upper levels. The floors and roof can be adjusted to accommodate three levels of vans when height restrictions are of no concern, or to a bi-level when height restrictions are a factor. The floors and roof can also be adjusted to allow the loading of vehicles with varying heights in the same multilevel carrier, while still maintaining the overall height of the multilevel carrier at a minimum value. Raising and lowering the roof, floors and ramps may be accomplished via a hydraulic, pneumatic, or electric lifting system or any combination thereof. The pump or motor for driving the lifting system may be attached to each car separately, or a single rail car connected to other rail cars in series. Alternatively, a portable pump or motor may be connected to each rail car (individually) for floor and height adjustment. Pneumatically operated systems, or hydraulic systems assisted by air, may be designed to utilize air from the train line or an independent air supply. Each floor may be lifted or lowered to its highest or lowest height level to simplify loading operations. The floor may be of a single one piece design or multi-sectional.

A typical loading procedure is accomplished by raising the entire second floor, or part of it, and loading the bottom level first. Next, the second floor is lowered to the minimum clearance, locked in place and then loaded. After this, the third level is lowered, locked in place and then loaded. Finally, the roof is lowered, locked in place and the access doors closed. To unload the vehicles, the loading steps are simply performed in reverse order.

In another embodiment of the invention, the second and third floors may be hinged to allow the loading of smaller vehicles without the need to raise or lower the entire floor. The ramp system in the lower floor compartment may be raised to a vertical plane for loading through to other coupled multilevel cars in a circus loading format.

The roof may be raised and lowered to adjust the height of the rail car in concert with or independently of the adjustment of the floors. The rail car is enclosed with panels that overlap one another from the top down and cover the loaded vehicles from the extreme range (maximum height) to the lowest adjustment (minimum height). A Wabco brake system may be utilized.

An advantage of an adjustable floor and roof is that this allows multilevel carriers to be configured in a manner that will maximize the utilization of the equipment by the user in markets where height restrictions are a major factor. The use of the low belly feature, thus allowing the first floor to drop below the center sill plane to within 4 to 40 inches of the rail, provides maximum use of the rail car's carrying capacity upwards to a height consistent with underpasses, tunnels, bridges, etc. This is consistent with rail requirements of government regulations and carrier specifications. It allows the user to convert a tri-level carrier into a bi-level carrier for use with varying height vehicles.

The ability to lower the floors and use the drop belly floor feature also lowers the center of gravity of the car. The floor may be moved via a gear, ratchet, piston, cog or worm screw system. According to the present invention, the system which is used should provide satisfactory securement, minimize slack associated with movement of the floor, and provide support for the floor and structure. For example, an adjustment system similar to those used on tractor trailer auto carriers is effective and may be easily adapted for use on a railroad auto carrier freight car.

The floor and roof assemblies as described in the present invention are an integral part of the car structure. They can operate independently or in conjunction with one another and directly affect the overall height of the car as they are raised or lowered in conjunction with each other. Additionally, the present invention allows further lowering of the height of the car by independently lowering the entire roof section after the carrier is loaded. The adjustment of the floor and roof of the current invention will have a direct relationship with the overall height of the car itself, i.e., lowering the floor of the car drops the height of the first level of autos which allows other levels to be lowered thereby allowing the roof to be lowered.

The invention as described provides a user with the ability to reduce the overall height of the car and specifically addresses several problems, e.g., route height restrictions and the ability to convert a rail car from a tri-level carrier to a bi-level carrier to a single level carrier to reduce the overall height of the rail car to the absolute minimum size within the confines of the smallest possible vertical space, consistent with the operator's requirements and specifications.

By utilizing the features of the present invention, a minimum height consistent with height requirements of the cargo being hauled can be realized whether or not the car is being operated as a bi-level carrier or a tri-level carrier when hauling different sizes of automobiles and vans.

Government regulations require that railroad car coupler heights must measure between 31½ to 34½ inches from the top of the rail to the center of the face of the coupler. This results in a need to design the floor height over the wheel area to accommodate the minimum required height over that space. The present invention incorporates both a standard design and a short center sill design that allows the floor to be level with or drop below the center sill just beyond the end of the sill and wheels. A single axle two wheel truck or a traditional four wheel truck type design may be utilized in a standard or an articulated type car.

In the present invention ramps or platforms may be utilized to provide access to the lower floor. Ramps on each end of the cars are connected to a center ramp or a single platform and can be raised to a horizontal plane, level with the platform over the wheel assembly. These ramps can then be lowered after loading. Additionally, the sectional ramps may be used on the diagonal plane. After the loaded ramps have been lowered, the second floor may be lowered to the minimum height which still provides clearance for the vehicles below.

The present invention also allows continued utilization of existing external ramp facilities without modification to accommodate the new rail car design. In addition, the rail car design does not affect the rail car's ability to be integrated with existing equipment or to be used and coupled with other mixed freight equipment. Furthermore, the invention allows the carrier to configure the same number of cars and vans in less vertical space. It also allows movement over height restricted routes that conventional tri-level and bi-level equipment cannot traverse, thus shortening the delivery time and reducing the collateral costs associated with longer travel times. The present invention also lowers the loaded car's center of gravity, thus facilitating higher speeds and more stability while negotiating corners and curves.

Incorporating the drop belly floor of the invention allows the loading of vehicles or other cargo between the rail car trucks. This facilitates the reduction of the overall height of the car carrier, depending on the height of the vehicles or cargo.

Moreover, in contrast to a fixed roof system, the present invention employs an adjustable roof system that can be moved in its entirety, not only to accommodate and facilitate the loading and unloading of vehicles, but also to adjust the overall height of the car for the transportation of freight over routes with limited height tunnels, bridges and overpass restrictions. Furthermore, the floor assembly can be adjusted in an empty or loaded state, which allows the user to set the final overall height of the rail car.

BRIEF DESCRIPTION OF THE DRAWINGS

The invention will be described in further detail hereinafter with references to illustrative preferred embodiments shown in the accompanying drawings in which:

FIG. 6 is a cross-sectional view of a railroad car in still another embodiment of the present invention;

FIGS. 7A–7D are end views of one embodiment of a door structure for an adjustable height railroad car in accordance with the present invention;

DETAILED DESCRIPTION OF THE INVENTION

Figure 1:
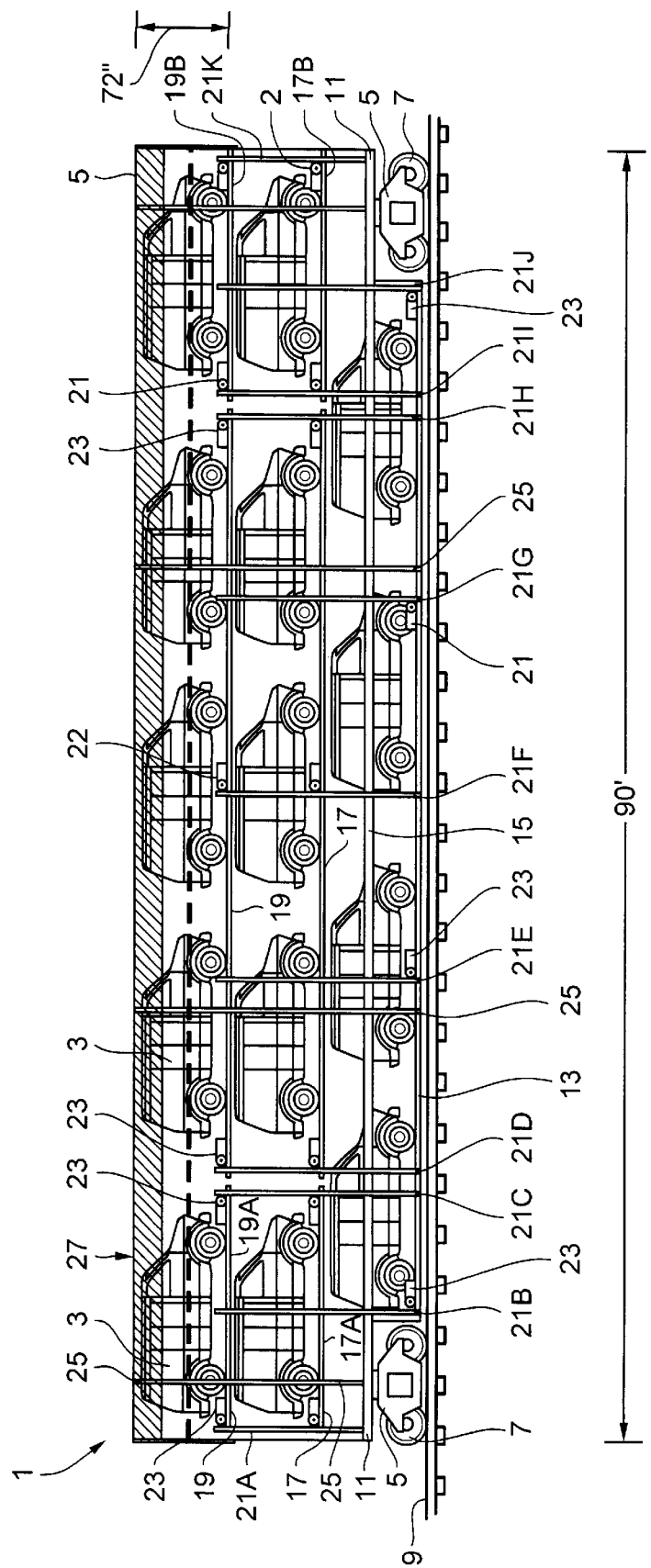
FIG. 1 is a cross-sectional view of one embodiment of a railroad car in accordance with the present invention.

Turning now to FIG. 1, there is shown a side elevation view of a rail car 1 in a preferred embodiment of the present invention. The side of the rail car facing the viewer has been removed in order to illustrate the multi-layer storage of automotive vehicles 3 within the rail car. The rail car 1 rides on a pair of conventional trucks 5 located at opposite ends of the car. Each of the trucks 5 include conventional wheels 7 which ride on rails 9. Each truck 5 supports the rail car 1 through a sill structure 11. The sill structure 11 extends over each of the trucks 5 and connects to and supports a lower floor or deck 13 extending between the trucks 5 and which may be located at a minimum height above the rail 9 of about 4 inches. The rail car 1 also includes side support members 15 which extend between the opposite end sill structures 11.

In the embodiment of FIG. 1, the rail car includes at least three levels defined by the lowest deck 13, an intermediate deck 17, and an upper deck 19. Each of the intermediate decks 17 and 19 are supported on vertical columns 21a–21k. As will be explained in more detail, each of the decks 17 and 19 are individually adjustable vertically by means of a plurality of actuation systems 23 which couple the decks to the vertical columns 21.

In addition to the columns 21, it will also be noted that there are other columns 25 which extend from the lowest deck 13 or sill structure 11 to the roof 27 of the rail car. As will also be explained, the columns 25 are adjustable in a vertical direction in order to adjust the height of the roof 27 with respect to the sill structure 11. As previously discussed, the overall height of the rail car 1 is desirably adjustable in order to allow the rail car to pass beneath some overpasses or to pass through some tunnels.

It will be noted that the intermediate decks 17 and 19 are each divided into a central section 17A, 19A, respectively, and a pair of end sections 19B, 19C and 17B, 17C. Three vans 3 are carried on each central section and a single van is supported on each end section. For this purpose, a pair of columns 21C and 21D are closely spaced as are columns 21H and 21I. The separate end sections 17B, 17C and 19B, 19C are individually adjustable to allow the end sections to function as ramps leading to the central sections 17A, 19A and also to allow clearance for loading vehicles into the lower level or deck 13. It will also be noted that deck 13 is adjustable by means of actuation devices 23 to allow the deck to be loaded with vans and then lowered into the position between the trucks 5. Alternately, the lowermost deck may be separately adjustable at each end to form ramps enabling the vehicles to be driven down into the lower section. Once the vehicles are loaded, the end of the ramps can be lowered to position the deck as shown in FIG. 1. Each of these methods will be discussed in further detail below.

Figure 2:
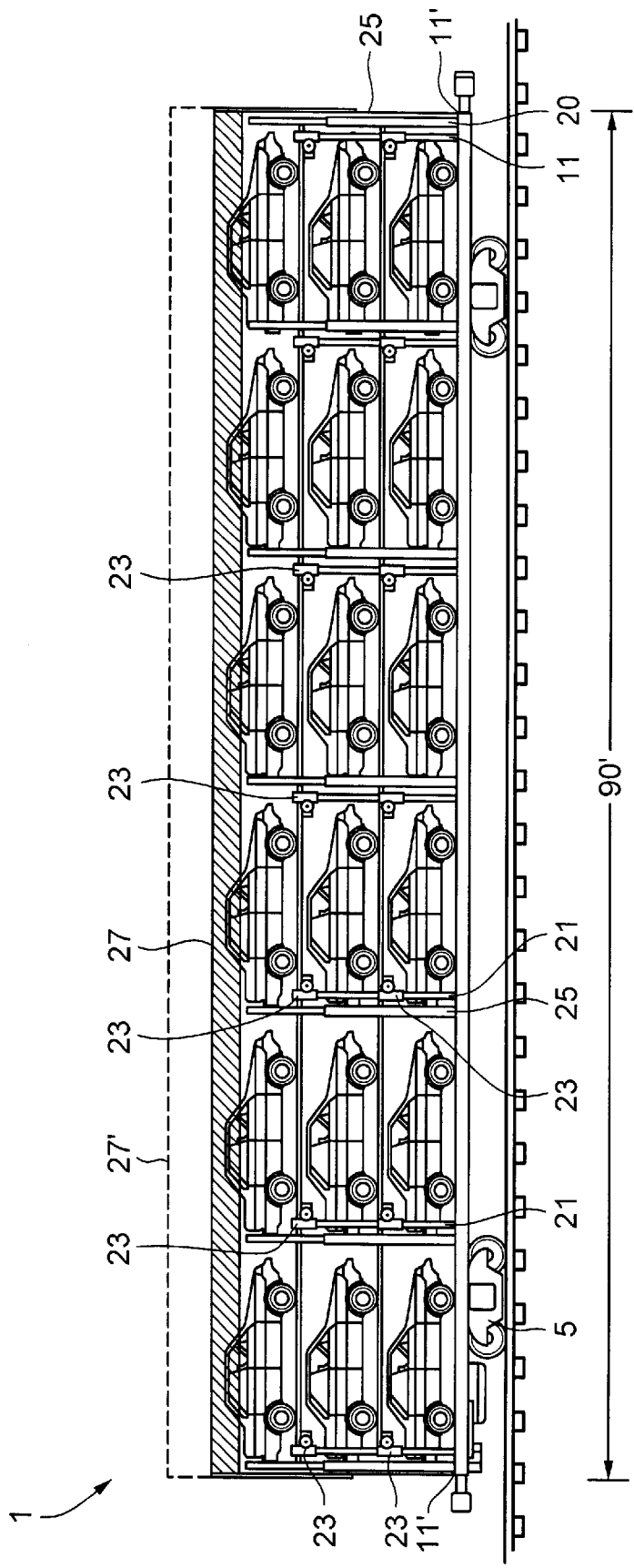
FIG. 2 is a cross-sectional view of another embodiment of a railroad car in accordance with the present invention.

The present invention also contemplates the use of a rail car structure which does not have the drop belly feature shown in FIG. 1. Referring now to FIG. 2, there is shown an alternate embodiment of the invention in which a rail car 1' incorporates a sill structure 11' which extends in substantially a planar configuration from one end of the rail car to an opposite end. Other than eliminating the drop belly feature and the attendant positioning of the lowermost deck, the rail car of FIG. 2 is substantially the same structure as that of FIG. 1. However, in FIG. 2, the vehicles being carried by the rail car are of a lower height than the conventional vans of FIG. 1 and thus can be loaded into the rail car with less spacing between the multiple decks. The roof 27 can also be lowered as indicated by the phantom line 27' showing a higher roof line.

Figure 3:
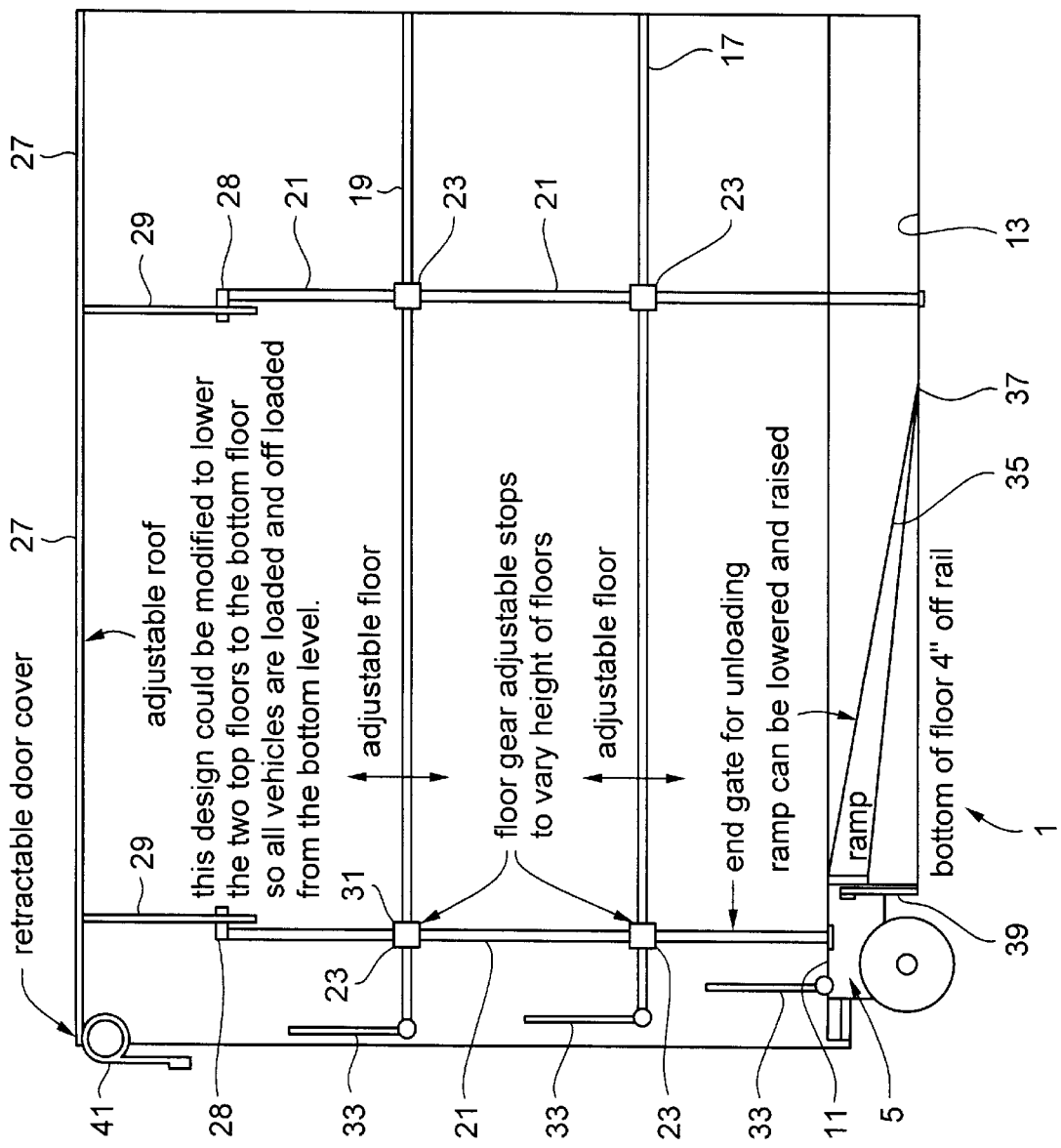
FIG. 3 is an expanded partial cross-sectional schematic representation of one end of the railroad car of FIG. 1.

Turning now to FIG. 3, there is shown a partial cross-sectional view of one end of the rail car of FIG. 1 illustrating additional elements of the car along with more detail of the adjustable deck or flooring structures. In this illustration, the truck 5 is schematically indicated as a single wheel but it will be appreciated that the truck has the same structure as that shown in FIG. 1. The embodiment of FIG. 3 differs from the embodiment of FIGS. 1 and 2 in that the roof 27 is adjustably coupled to the columns 21. This arrangement eliminates the separate columns 25 which were described for independently controlling the roof position. However, the roof 27 is still independently adjustable using a gear drive connection 28 between the column extensions 29 and the respective one of the columns 21. In a preferred form, the connection between extensions 29 and columns 21 may be a motor driven worm gear arrangement. Obviously, other forms of connection could be made such as by having a rack and pinion gear arrangement, a hydraulic or pneumatic telescoping arrangement or hydraulic motor to drive a worm gear or a rack and pinion gear.

Each of the floors 17 and 19 are independently coupled to the columns 21 by an adjustment apparatus indicated at 23. Preferably, the apparatus 23 comprises a motor driven worm gear assembly which provides exact positioning with maximum assurance that the floors will not shift position in the event of loss of power to the motor. As discussed above, the motors could be electric motors or hydraulic or pneumatic motors. However, it is also contemplated that the floors may be coupled to the columns 21 through a hydraulic or pneumatic actuator.

It will also be seen that each of the floors or decks 17 and 19 and the sill structure 11 include an end gate or ramp 33 which can be raised and lowered in order to facilitate loading of each deck and to block the end of each deck once the vehicles are loaded onto the deck. Each of the ramps 33 are pivotably attached to a respective one of the decks or sill structure.

In order to best utilize the additional storage space provided by the low belly design of the rail car of FIG. 1, separately adjustable end ramps 35 lead from the sill structure 11 to the lowermost deck 13. The ramps 35 may be pivotably mounted at an inner end 37 and mounted to a vertical adjusting mechanism 39 at the outer end. The vertical adjusting mechanism 39 may include a hydraulic or pneumatic actuator or a motor driven worm gear or rack and pinion gear arrangement similar to that used to support each of the decks 17 and 19. A slidable pivot mount at end 37 may be adopted in order to provide clearance for the ramp outer end as it is lowered.

The embodiment of FIG. 3 also includes a retractable door cover 41 which may be formed of a plurality of hinged or pivotably coupled slats to enable rolling the door onto a cylindrical retainer, i.e., a structure similar to a roll top desk top. Preferably, the door would be formed of metal or high impact plastic in order to provide structural resistance to entry into the rail car. Such doors are commonly known for closing storage compartments and the particular construction of this type door is not a part of the present invention.

Figure 4:
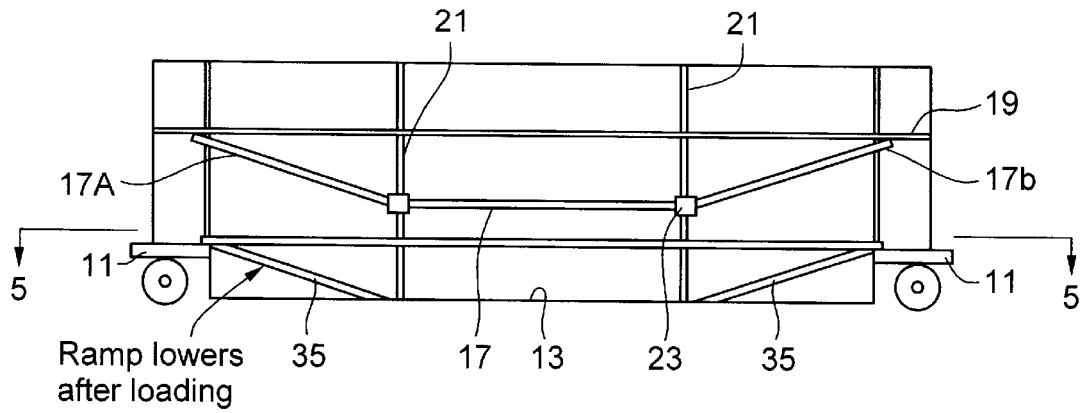
FIG. 4 is a cross-sectional schematic representation of the railroad car of FIG. 1 illustrating movement of the deck levels to form ramps.

Turning now to FIG. 4, there is shown a schematic representation of the rail car 1 of FIG. 1 illustrating how the end sections 17B and 17C of the mid deck 17 can be pivotably raised in order to provide access to the lower deck 13. Further, while it is contemplated that the decks may be continuous from side to side of the rail car, it is also possible that the decks may be simply runways for supporting wheels of the vehicle. While not shown, it will be recognized that the end sections 17B and 17C can also be lowered to form ramps leading from the sill structure 11 to the level of the deck center section 17A.

Figure 5:
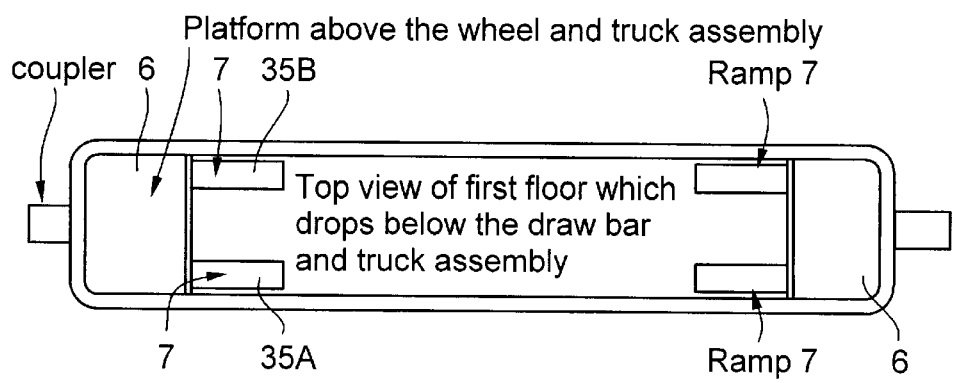
FIG. 5 is a top plan view of the lowest deck level of the railroad car of FIG. 1.

Referring now to FIG. 5, there is shown a top plan view of the lower section of the rail car of FIG. 4 taken at the line 5—5 illustrating the use of a pair of spaced ramps 35A and 35B at each end of the rail car to provide access to the lower deck level 13. The advantage of using the spaced ramps rather than a continuous ramp is obviously one of weight reduction. However, the disadvantage is that the ramps may have to be adjusted to accommodate different widths of vehicles being transported and the separated ramps may require separate actuators for each ramp.

While the rail cars as illustrated in FIGS. 1 and 2 are essentially tri-level cars, it will be apparent that these cars can be readily converted to bi-level cars by simply collapsing two of the decks together. For example, deck 19 could be collapsed onto deck 17 to form a bi-level car. At the same time, the roof 27 can be lowered to reduce the overall height of the car and thereby allow passage of the car through tunnels or underpasses having minimal clearance. In the embodiment of FIG. 1, it is also possible to simply collapse the roof 27 onto the upper deck 19, assuming of course that the vehicles are not loaded in the car, thus lowering the overall height of the car. In the rail car of FIG. 2, it is also possible to collapse the mid floor 17 onto the lower deck 13 and to lower the upper deck 19 and roof 27 to form a bi-level car. The number of variations of roof and deck adjustments in order to convert the rail car of FIGS. 1 and 2 into a bi-level and thus lower profile car may depend on the particular load being transported and how much actual space is needed or how much support is needed at the different floor levels. By way of example, FIG. 6 illustrates the rail car 1 of FIG. 1 in which the mid level deck 17 has been lowered to a level coextensive with the end sills 11. In this form, a single deck structure extends from sill to sill using deck 17 while covering the lowest deck level 13. At the same time, the upper deck 19 has been dropped down to a lower level, but with sufficient clearance between decks 17 and 19 to allow a car or vehicle to be positioned between the decks, and the roof 27 has been dropped down to thereby lower the overall profile of the rail car. One of the advantages of the structure illustrated in FIG. 6 is that the space between the deck 17 and the lower deck 13 is now available for transport of other cargo. For example, boxed freight may be placed on the lower deck 13 beneath the deck 17.

An additional feature which is partially visible in the view of FIG. 6 is an alternate construction of an end closure of the rail car. In this embodiment, an end closure 43 comprises two pairs of doors which are hinged to the side of the rail car 1 and adapted for swinging outward in order to provide access to the rail car. Each set of doors is associated with a different section of the rail car such that when the roof 27 is lowered, a set of doors 45 attached to the roof is lowered concurrently. The upper set of doors 45 attach to the roof section 27 overlap a lower set of doors 47 attached to the lower, non-adjustable sides of the rail car so that there is a sliding engagement between the upper set and the lower set of doors. As will become apparent, the roof 27 is part of a roof structure 49 which includes the roof 27 and a pair of attached depending side panels 51A, 51B. A better view of the end closure doors is shown in FIGS. 7A–7D. In FIG. 7A, the rail car is shown in its tallest configuration with an upper set of doors 45 and a lower set of doors 47 in an open position. In FIG. 7B, the doors are shown in their closed position. FIG. 7B shows the door set 45, 47 closed with the overlap between the doors indicated by the darkened line at 49. In the open and closed configurations as shown in FIGS. 7C and 7D respectively, the rail car is shown in its minimal height configuration with a substantial amount of overlap of the end closure doors as indicated by the wide darkened area 49. While the doors 45, 47 are shown as simply overlapping, it will be appreciated that the doors may desirably be constructed with some form of sliding interlocking relationship so that opening and closing of the lower doors will concurrently open and close the lower doors. Such can be achieved by using channels on one set of doors for the other doors to slide within or by using a pin and slot arrangement or other methods known in the art.

In addition to the desirability of providing an overlapping door configuration for the adjustable height rail car, it is also desirable to provide moveable sidewalls on the rail car and a similar overlapping construction can be used to provide the required security for the car while allowing adjustability of the sidewalls.

Figure 8:
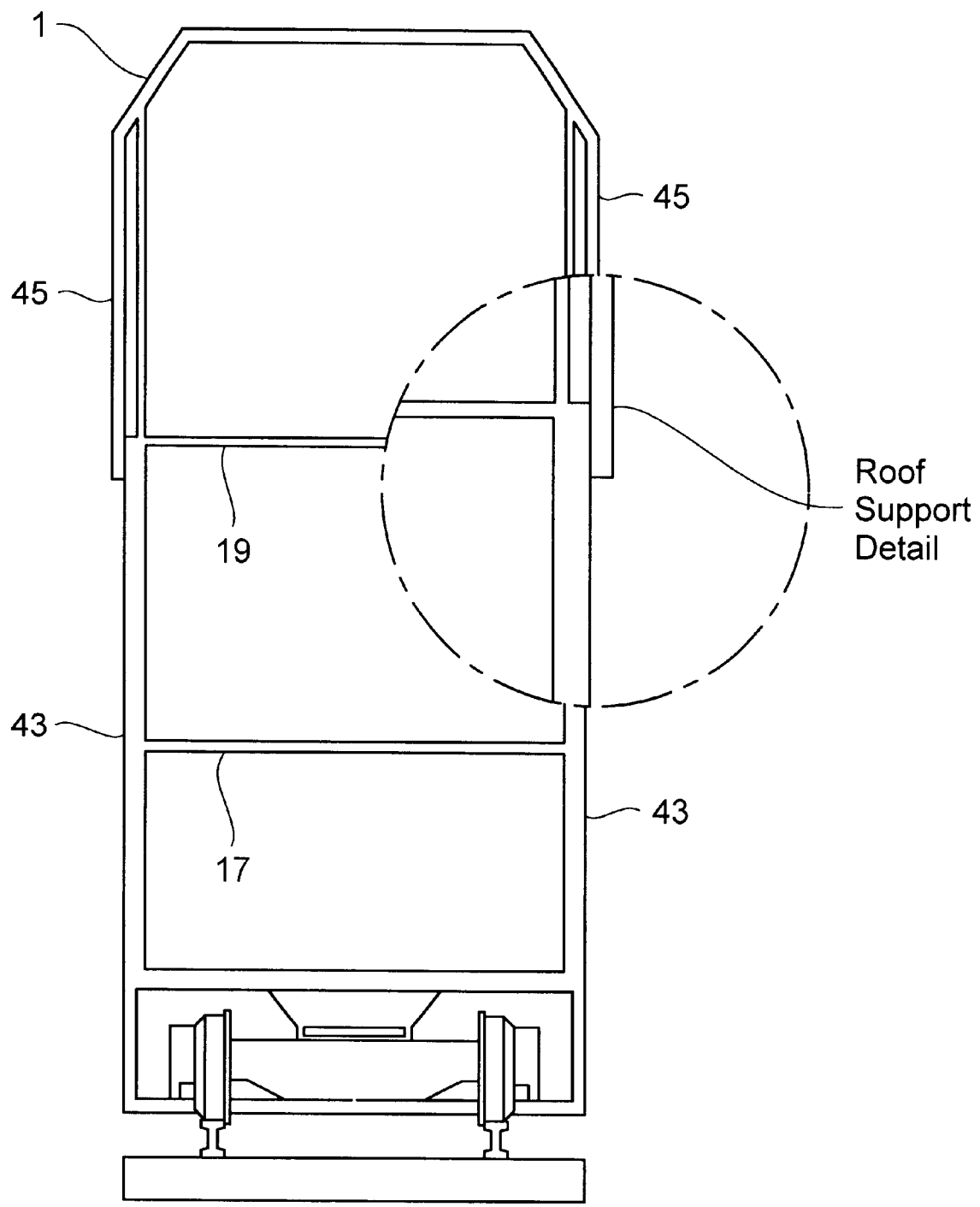
FIG. 8 is a cross-sectional view of one embodiment of a railroad car illustrating a relationship between the movable roof structure and the fixed floor structure.

FIG. 8 shows a cross-sectional view taken along the line 8—8 of FIG. 6 with a pair of lower sidewalls 53A, 53B set inward of the respective upper sidewalls 51A, 51B. In a preferred form, the upper sidewalls 51 are designed to be in contact with the lower sidewalls 53 in order to minimize vibration and wear between the panels. As previously stated, the roof structure 49 includes the combination of the roof 27 and the attached upper sidewalls 51A, 51B.

Figure 9:
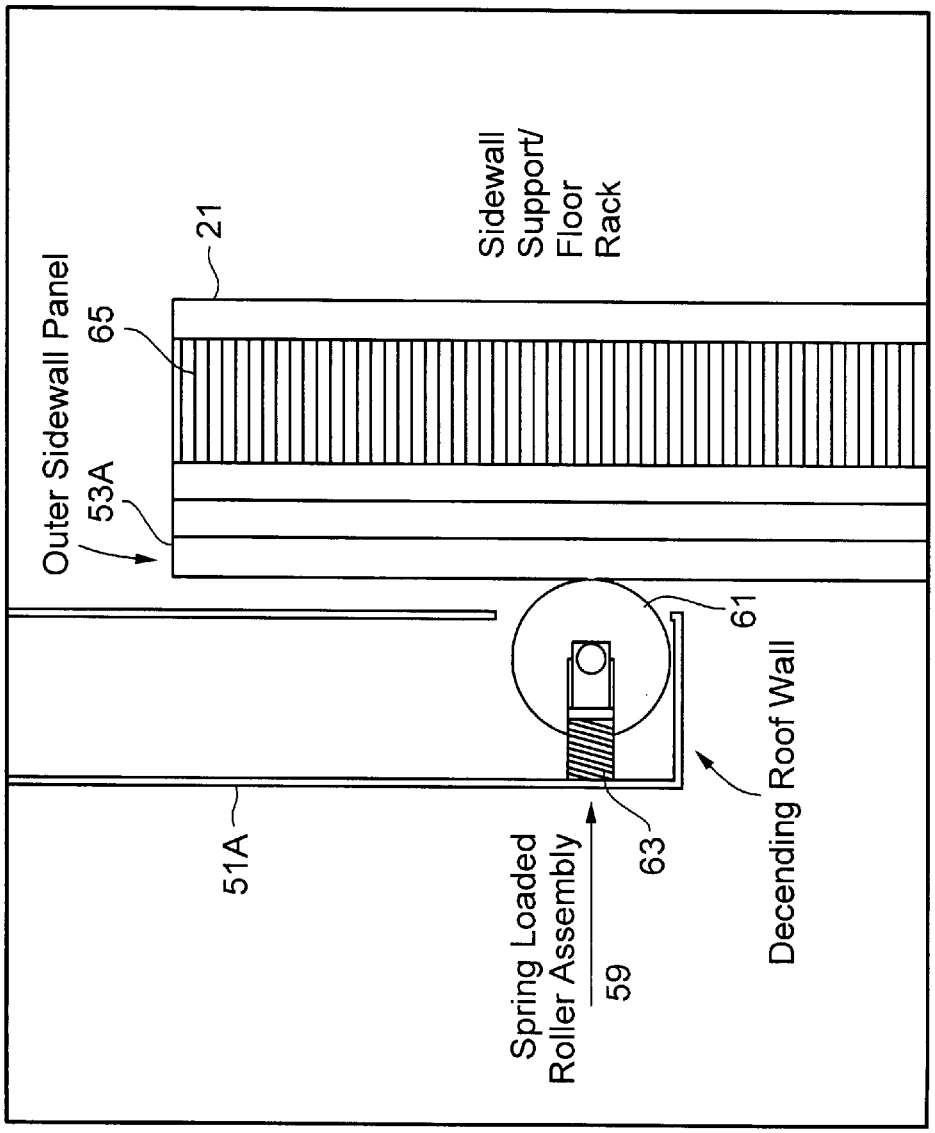
FIG. 9 is an expanded view of a detail of the relationship at the joint between the movable roof structure and the stationary floor structure.
Figure 9A:
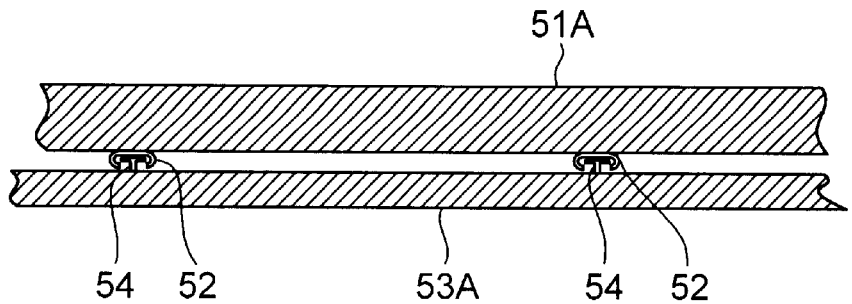
FIG. 9A is a partial cross-sectional view of a car sidewall and adjacent roof sidewall showing sliding engagement therebetween.

FIG. 9 is an enlarged cross-sectional view of the area indicated in the phantom line 57 of FIG. 8 and shows one form of contact arrangement between the descending roof sidewall 51A and the lower sidewall 53A. In this form, a roller assembly 59 including a roller 61 and a spring loading mechanism 63 maintains a constant pressure between the outer sidewall 51A and the inner sidewall 53A. There is also shown a floor mounted column 21, including a plurality of racks 65, for supporting the inner floor decks 17, 19 and to which the side wall 53 is mounted. Other methods and apparatus for slidably coupling the upper side walls 51 to the lower side walls 53 will be apparent to those skilled in the art. For example, a plurality of vertically extending, laterally spaced, interlocking channel members may be cooperatively attached to the roof sidewall 51A and the car sidewall 53A. FIG. 9A is a cross-sectional view of a section of sidewall 51A overlaying car sidewall 53A showing a pair of mating channel members 52, 54 which serve to both restrain and guide the roof structure as it is raised or lowered. In the illustrated form, member 52 is a channel and member 54 is a T-shape extrusion sliding in channel member 52. The channel members provide additional support to prevent forward or backward movement of the roof structures.

Figure 10:
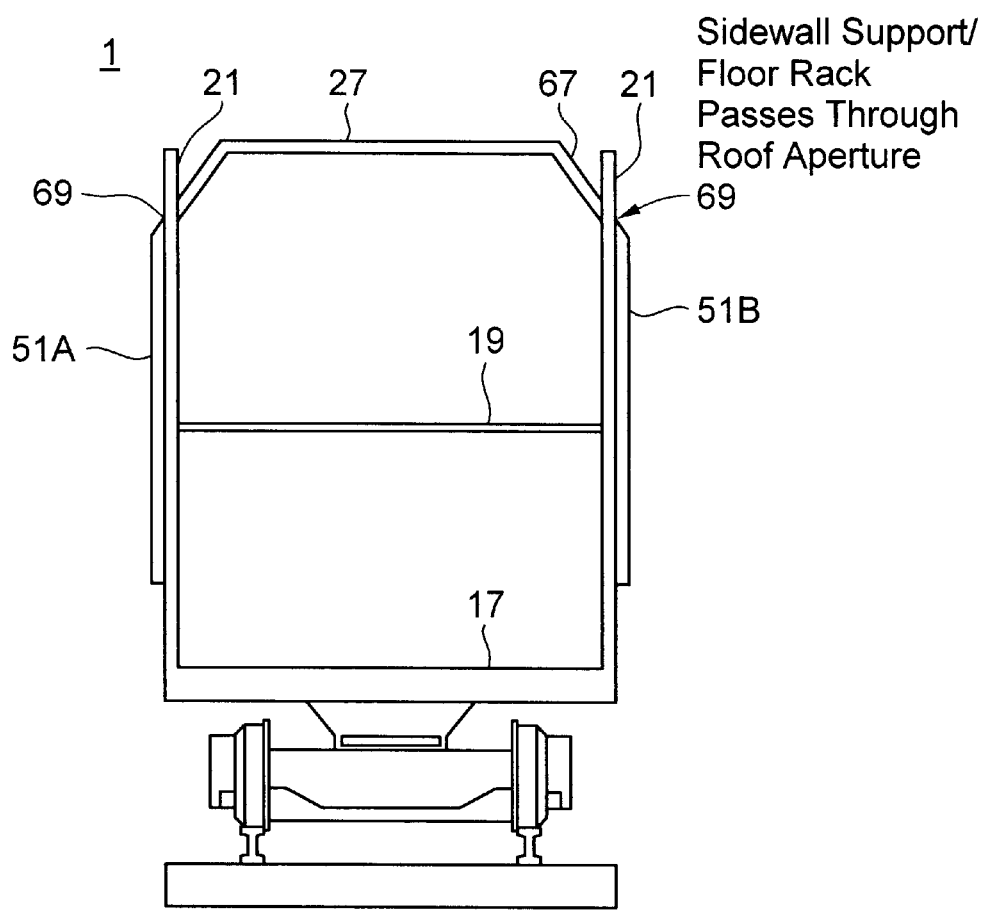
FIG. 10 is a cross-sectional representation of another embodiment of the present invention accommodating a low roof design with rounded corners.

FIG. 10 illustrates a situation which may occur when the roof 27 is lowered to its lowermost position and the support columns 21 are fixed in height such as would occur if the columns were associated with rack and pinion gear arrangements as shown in FIG. 9. The roof structure of most rail cars is rounded so that the roof 27 slopes off from the highest point of the car to the sidewalls 51. This structure is generally known in the industry and derives from the construction of tunnels in which the roof of the tunnels is typically rounded in order to provide maximum strength of the tunnel roof. With this configuration of roof 27, if the roof is lowered to a minimum height, it is possible that the columns 21 may have to protrude through the rounded corners 67 of the roof. For that purpose, it is also contemplated that the roof may be constructed with apertures 69 located above the columns and adapted to allow passage of the columns through the roof structure. Such an arrangement is shown in the end view of FIG. 10.

Figure 11:
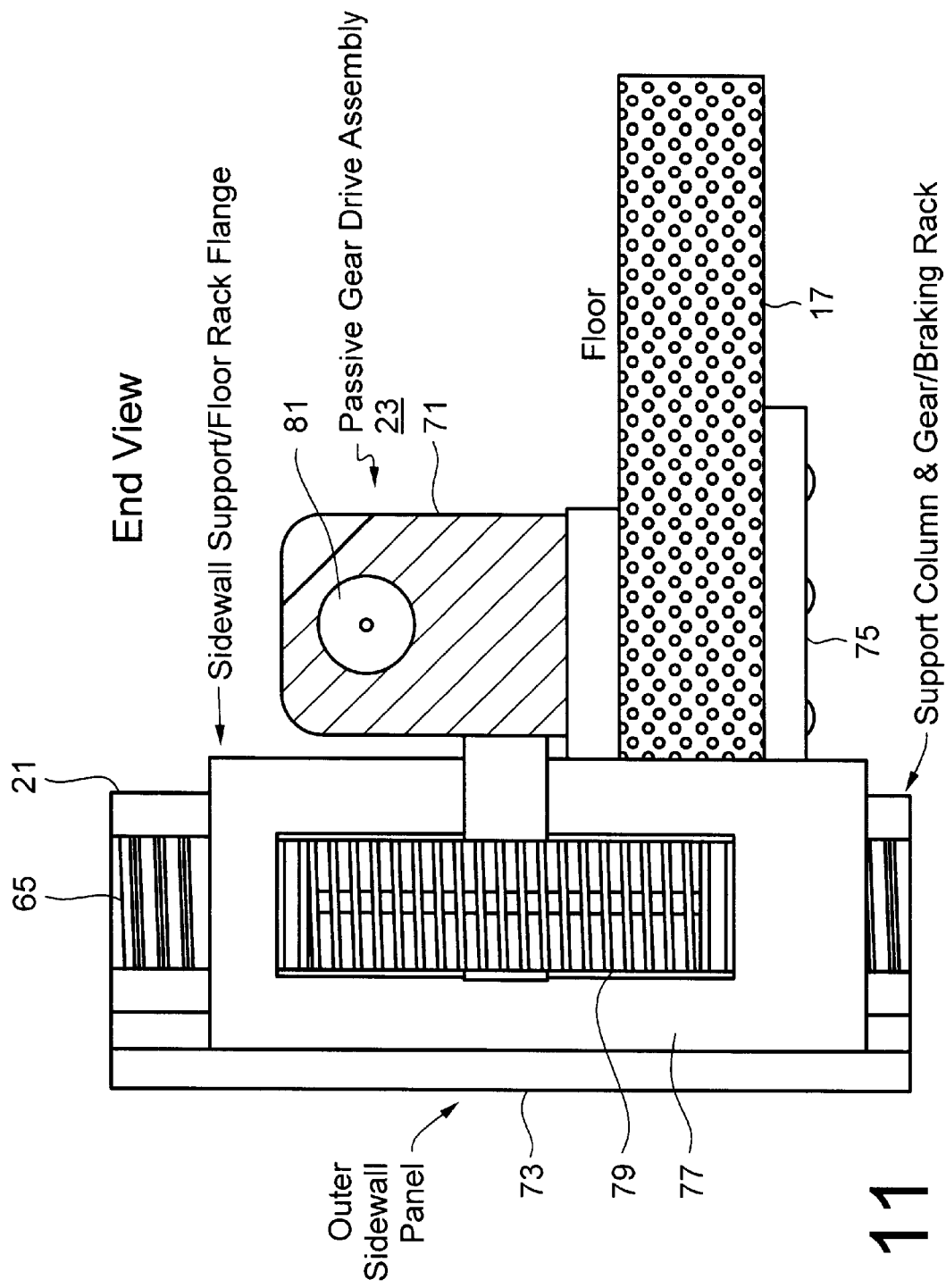
FIG. 11 is a simplified end view of an apparatus for adjusting the height of decks within the rail car of the present invention.
Figure 12:
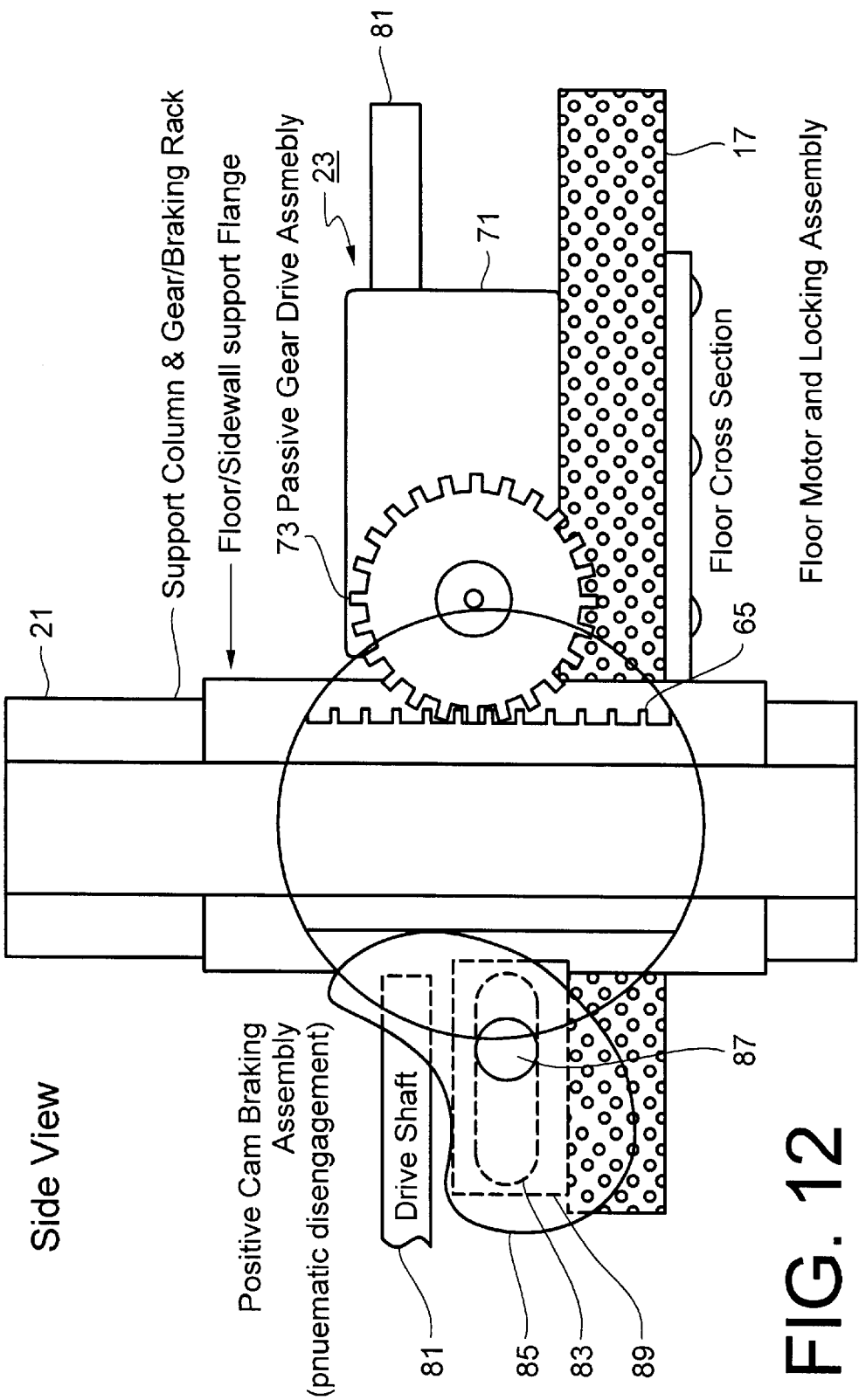
FIG. 12 is a side view of the adjusting mechanism of FIG. 11.

Turning now to FIGS. 11 and 12, there is shown an end view and a side view, respectively, of one form of drive assembly 23 for connecting respective ones of the floors or decks 17 and 19 to the support columns 21. In this embodiment, the drive assembly 23 is a rack and pinion gear arrangement with the rack 65 being formed on the columns 21 and the gear being coupled to the respective one of the floors 17 and 19. The drive assembly includes a motor 71 coupled in driving relationship with a gear 73. The teeth of the gear 73 engage the rack 65 which is fixedly attached to and forms a part of the column 21. As the gear 73 is rotated by the motor 71, the floor 17 (or 19) which is fixedly attached to the motor and gear assembly, is moved on the column 21. The motor assembly includes a lower plate 75 which is bolted to floor 17 thereby fixedly attaching the motor assembly to the floor. The plate 75 is attached to a slide member 77 which fits about column 21. The member 77 includes an opening 79 through which the gear 73 protrudes for engaging the rack 65. The plate 75 is preferably welded to slide 77 and supports the floor 17 (or 19) to the slide 77. The motor 71 may be electric, hydraulic, pneumatic or merely a passive gearbox driven by a remote motor through a drive shaft 81. The remotely driven passive gearbox arrangement may be more cost effective than using individual active drive motors and may simplify concurrent movement of each drive assembly to prevent twisting of the moving deck since all passive drive motors would rotate concurrently. Other drive arrangements can accomplish the same concurrent operation but may require position sensors (not shown) at each column to assure that deck position is adjusted uniformly. However, separate drive motors are desirable for adjusting ends of the decks to create ramps and for positioning the ramps 35 of FIG. 3.

In the side view of FIG. 12, it can be seen that the drive assembly 23 also includes a positive cam braking assembly 83 having a cam member 85 rotatable about a pin 87 to frictionally engage the column 21 and prevent slippage of the floor on the column. The cam member 85 is mounted by pin 87 to a movable block 89 which may be remotely operated such as by being pneumatically movable to disengage the cam.

Figure 13:
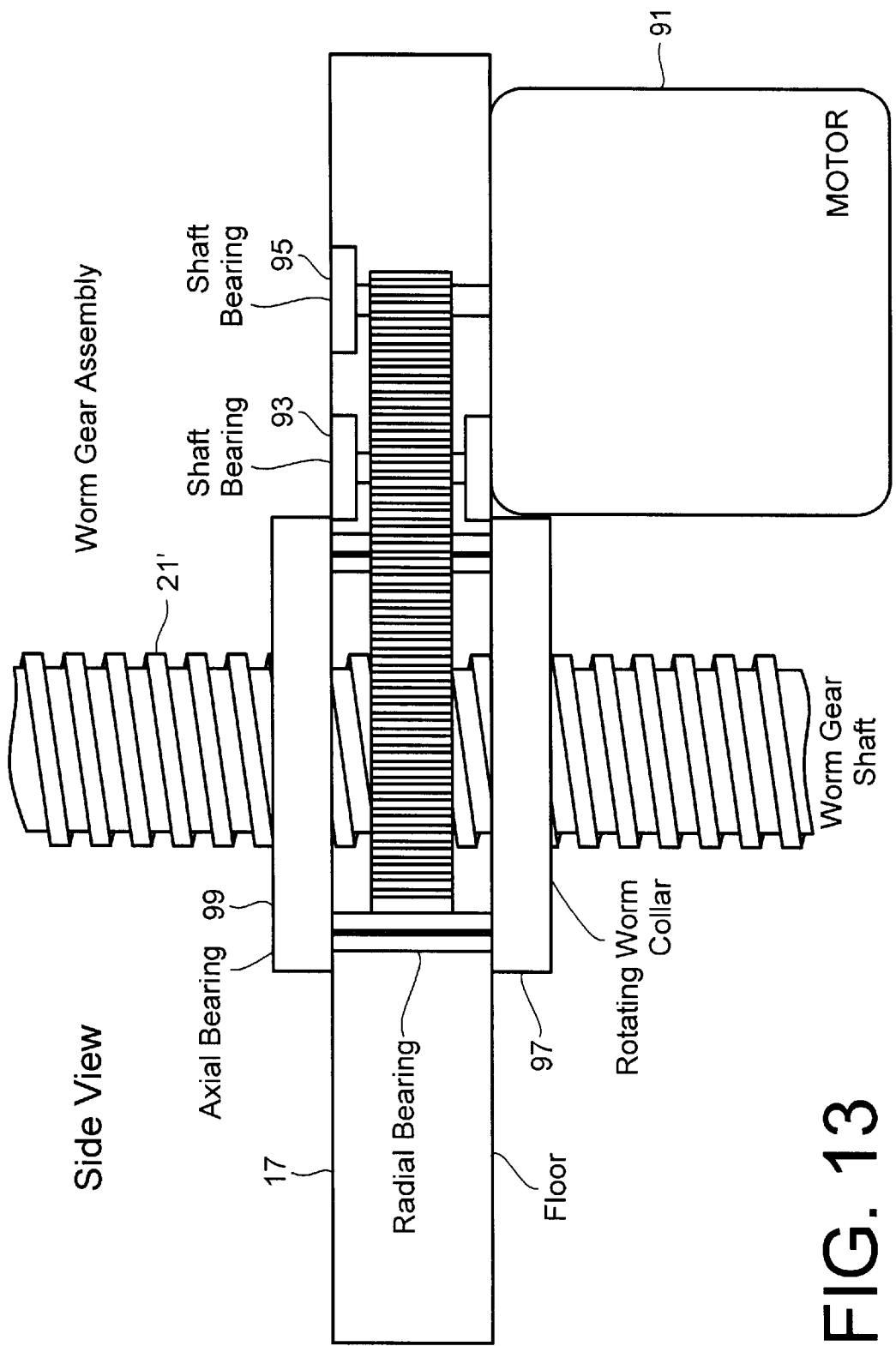
FIG. 13 illustrates an alternate embodiment of the deck adjusting apparatus in the form of a worm gear drive mechanism.

Referring to FIG. 13, there is shown an alternate embodiment of the drive mechanism 23 utilizing a worm gear assembly. In this embodiment, the column 21 functions as a worm gear shaft 21' and a drive motor 91 is coupled through a pair of gears 93, 95 to a drive gear 97 mounted on the shaft 21'. The drive gear 91 is mounted in a bearing assembly 99 and the bearing assembly is fixedly attached to the appropriate one of the floors 17 and 19. The advantage of the drive gear assembly disclosed in FIG. 13 is that the worm gear arrangement generally resists movement of the floor assembly unless the drive gear 97 is rotated. While not shown in FIG. 13, it may also be desirable to use a separate pin to pin the drive gear to the housing in order to assure that the gear does not rotate once the floor has been positioned at a desired location. It will also be appreciated that the motor may be an electric motor, pneumatic or hydraulic motor or be a passive transmission coupled to a drive shaft as shown in FIG. 12. A pneumatic motor may be advantageous since the trains are normally equipped with air compressors and air lines which can be used to power the motor. The connection between the floor and bearing assembly 99 is not shown but it will be recognized that such attachment is readily made through bolted, welded or other form of connection known in the art.

Figure 14:
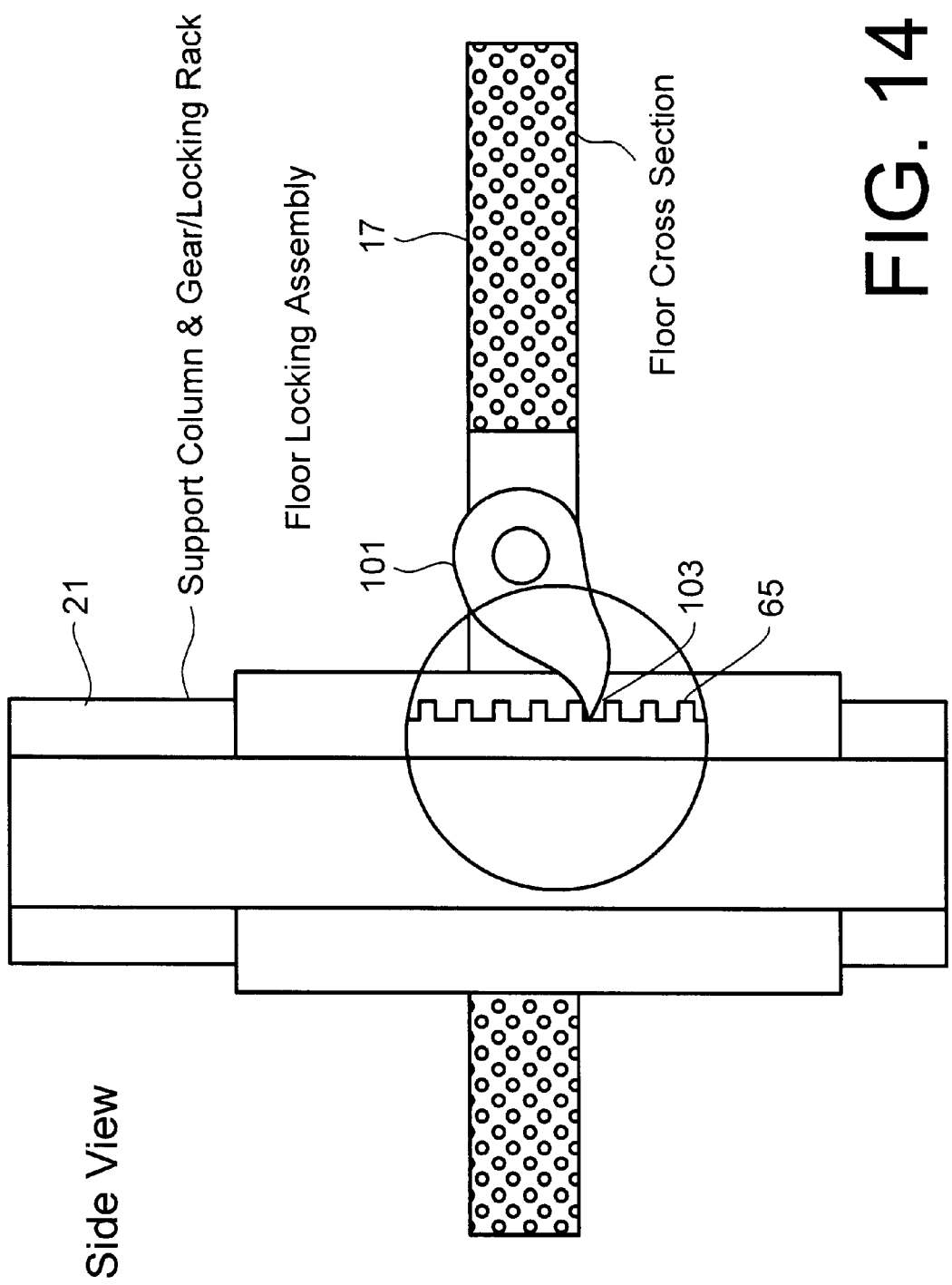
FIG. 14 illustrates a floor locking assembly useful with the floor level adjusting means of FIG. 11.

FIG. 14 shows an alternate method of locking the floor to the support column 21 using a positive cam locking arrangement. In this embodiment, a cam 101 includes a tip 103 adapted for engaging the rack 65 on one side of the column 21 through the opening 79 thereby positively inhibiting downward movement of the floor. The cam can be released by raising the floor and then rotating the point of the cam out of engagement with the rack assembly. While this locking arrangement could be used with the drive assembly 23 illustrated in FIG. 12, it is also contemplated that this arrangement be used in an embodiment in which the floor adjusting columns are separate from the floor support columns as is discussed below.

Figure 15:
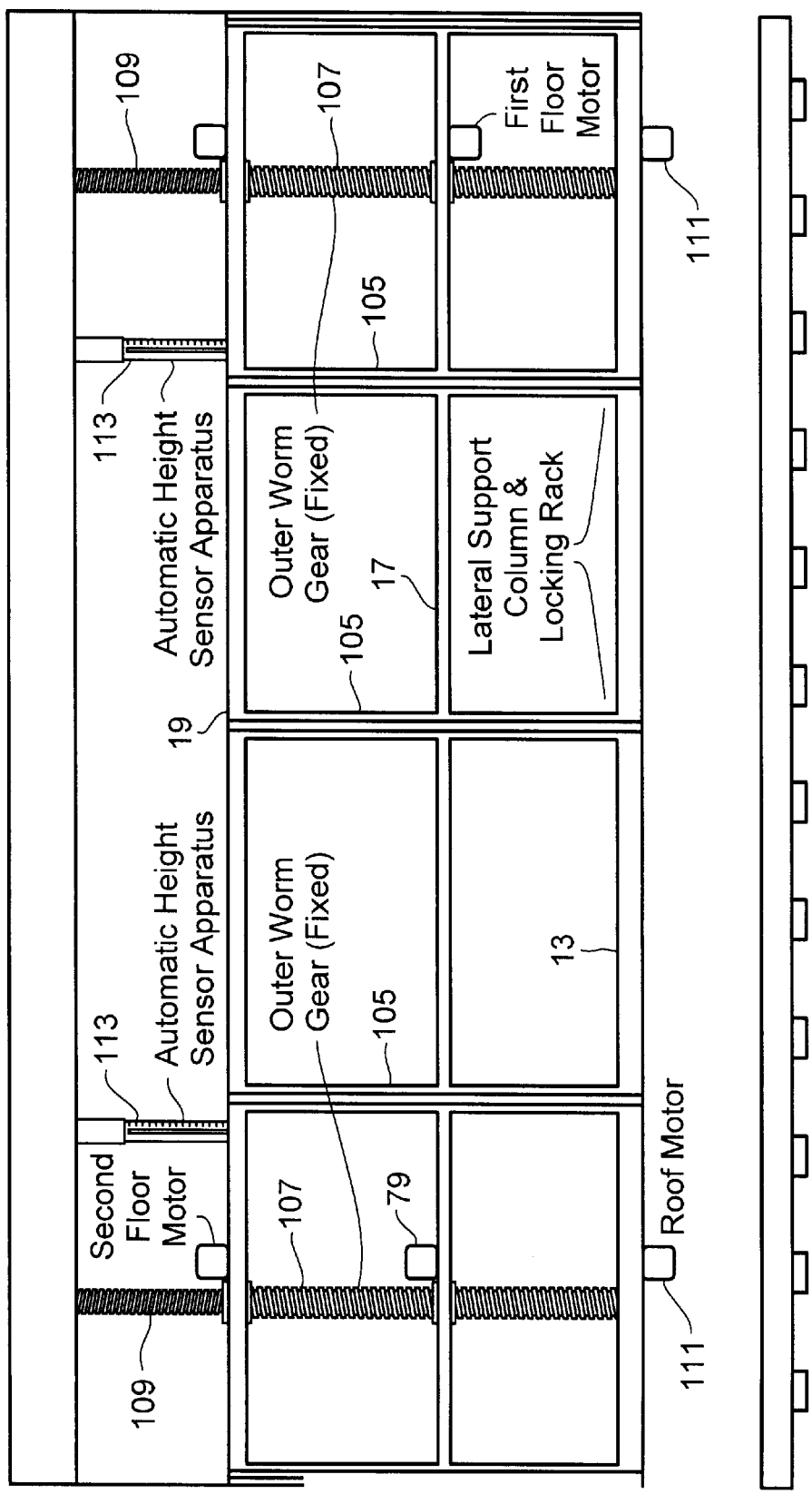
FIG. 15 illustrates an alternate embodiment of a roof and intermediate deck adjusting mechanism for use with the present invention.

Referring now to FIG. 15, there is shown another embodiment of the present invention in which the rail car 1 is provided with a plurality of lateral support columns 105, each of which includes a latching or locking rack such as is shown in FIG. 14 to fix each elevated deck in position after the deck has been raised or lowered by use of the spaced jacks 107. The jacks 107 preferably take the form of hollow, cylindrical worm gears as described with respect to FIG. 13. Each deck 17, 19 is supported on the jacks 107 using the above described worm gear drive. In addition, a separately controllable threaded shaft 109 extends through the jacks 107 to adjustably support the roof 27. Each of the shafts 109 engage threads or threaded members fixed within jacks 107. Each shaft 109 is driven by a respective motor 111 to enable raising and lowering of roof 27. Automatic height sensors 113 may be used to control positioning of the height of roof 27 from deck 19. Once adjusted to a desired height, each deck 17, 19 may be bolted or pinned to the vertical support columns 105 or latched using the mechanism of FIG. 14. The height sensors 113 may be electronic sensors which provide signals to allow remote control to the height of roof 27 above floor 19. The interlocking (pinned or bolted) attachment between the floors or decks 17, 19 and the side wall support columns 105 provides lateral and diagonal structural support/rigidity to the car. This structural integrity is further augmented by the interlocking channels of the roof sidewall and car sidewall.

As a variation of the embodiment of FIG. 15, it will be recognized that the shafts 109 may be coupled to threaded members attached to upper deck 19 rather than extending into jacks 107. Such a variation would require moving the drive motors 99 to the roof structure and such variation is contemplated within the scope of the present invention. It is also contemplated that the motors 111 may be mounted in the roof structure even with the embodiment of FIG. 15.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. An adjustable, multi-level railroad car for transporting automotive vehicles, the car having a pair of spaced trucks and a sill structure extending between the trucks, the invention comprising:
   a plurality of adjustable support members fixed to the sill structure and extending vertically upward therefrom, each of the adjustable support members including apparatus for adjusting at least the vertical height of the support members;
   a roof structure coupled to the top of the support members and movable therewith for adjusting the height of the roof structure with respect to the sill structure; and
   at least one intermediate deck member positioned in the car between the sill structure and the roof structure, the intermediate deck member being adjustably supported on the support members and adapted to be vertically adjustable independently of the roof structure for adjusting spacing between the sill structure and the roof structure to enable supporting a plurality of different height automotive vehicles for transport within the railroad car.

2. The railroad car of claim 1 and including at least an upper side panel and a lower side panel on each side of the railroad car, said upper side panel being coupled for vertical movement with said roof structure and being arranged to descend in overlapping relationship with said lower side panel.

3. The railroad car of claim 2 and including apparatus for closing each end of the car, the apparatus comprising an upper pair of doors and a lower pair of doors, said upper pair of doors being coupled to said upper side panels and said lower pair of doors being coupled to said sill structure, said upper pair of doors being arranged in overlapping relationship with at least an upper portion of said lower pair of doors for maintaining closure of said ends of the car irrespective of the position of said upper side panels.

4. The railroad car of claim 2 and including a roller assembly coupled to said upper adjustable side panel and positioned and adapted for engaging an outer surface of said lower side panel for enabling overlapping movement of said upper side panel over said lower side panel.

5. The railroad car of claim 1 and including a plurality of drive means for coupling the at least one deck member to a first plurality of the adjustable deck support members, each of the drive means being adapted for concurrently vertically adjusting the horizontal plane of the deck structure.

6. The railroad car of claim 5 and including a first plurality of latching adjustable support columns for supporting said at least one deck at a selected horizontal plane and a second plurality of adjusting columns for adjusting said at least one deck vertically to the selected horizontal plane.

7. The railroad car of claim 5 wherein said drive means comprises a motor coupled in driving relationship with a pinion gear, each of said deck adjustable support columns including a rack for engagement with teeth of the pinion gear whereby actuation of said motor to drive the gear functions to adjust the vertical position of the deck.

8. The railroad car of claim 7 wherein said motor comprises a passive drive means and wherein a plurality of said motors are coupled to a single drive shaft for concurrently driving each of said motors coupled thereto.

9. The railroad car of claim 5 wherein each of the adjustable support columns comprising a worm gear, the drive means comprises a motor coupled in driving relationship with a hollow gear having a central threaded aperture for passage of the worm gear, whereby rotation of the hollow gear is effective to adjust the vertical position of the hollow gear on the worm gear.

10. The railroad car of claim 1 wherein said sill structure comprises a central portion extending between a first sill overlaying a first one of said pair of trucks and a second sill overlaying a second one of said pair of trucks, said central portion being vertical adjustable between a first position substantially co-extensive with said first and second sills and a second position vertically lower than said first and second sills.

11. The railroad car of claim 10 wherein said central portion comprises at least a center section, a left end section and a right end section, each of said left and right end sections including means for vertically adjusting an inner end independently of an outer end to thereby form a ramp leading from respective ones of said first and second sills to said second position.

12. The railroad car of claim 1 wherein said adjustable vertical support members each comprise a column having one end fixed to said floor structure and an opposite end extending at least co-extensive with said at least one intermediate deck member, said adjusting apparatus comprising lifting means coupled to and between said opposite end and said roof and adjustable with respect to said opposite end for establishing a selected height of said roof with respect to said floor.

13. The railroad car of claim 12 wherein said columns are hollow and internally threaded and said lifting means comprises threaded rods extending through said columns and coupled to be rotatably driven for adjusting the extension thereof from said columns for adjusting the height of said roof above the floor.

14. The railroad car of claim 12 wherein said lifting means comprises an adjustable height rod extending between said at least one intermediate deck and said roof for adjusting the height of said roof with respect to said deck.

15. An adjustable height rail car comprising:
   a sill structure;
   a pair of spaced trucks supporting said sill structure for rail operation;
   a pair of opposite side walls fixed to said gill structure and extending upwardly therefrom;
   a roof structure overlaying said side walls and adjustably connected to said rail car such that said roof can be raised and lowered with respect thereto, said roof structure includes integrally connected, downwardly extending side panels arranged to overlap, in general sliding relationship, at least an upper portion of each of said side walls;
   a plurality of support columns extending upwardly from said sill structure, said roof structure being adjustable mounted to said support columns; and
   a plurality of cargo support decks positioned in said rail car and adjustably connected to said support columns.

16. The adjustable height rail car of claim 15 wherein a lower most one of said decks is rigidly attached to the sill structure and extends between said trucks at a level above or below said sill structure.

* * * * *